US005903911A

United States Patent [19]
Gaskins

[11] Patent Number: 5,903,911
[45] Date of Patent: May 11, 1999

[54] CACHE-BASED COMPUTER SYSTEM EMPLOYING MEMORY CONTROL CIRCUIT AND METHOD FOR WRITE ALLOCATION AND DATA PREFETCH

[75] Inventor: Darius D. Gaskins, Austin, Tex.

[73] Assignee: Dell USA, L.P., Round Rock, Tex.

[21] Appl. No.: 08/903,232

[22] Filed: Jul. 18, 1997

Related U.S. Application Data

[63] Continuation of application No. 08/423,472, Apr. 6, 1995, abandoned, which is a continuation of application No. 08/081,917, Jun. 22, 1993, abandoned.

[51] Int. Cl.$^6$ .................................................. G06F 13/00
[52] U.S. Cl. .......................... 711/141; 711/133; 711/137
[58] Field of Search .............................. 711/3, 118, 133, 711/134, 137, 141

[56] References Cited

U.S. PATENT DOCUMENTS

| | | | |
|---|---|---|---|
| 4,298,929 | 11/1981 | Capozzi | 711/201 |
| 4,366,539 | 12/1982 | Johnson et al. | 711/218 |
| 4,649,511 | 3/1987 | Gdula | 711/106 |
| 4,816,997 | 3/1989 | Scales, III et al. | 711/118 |
| 5,091,845 | 2/1992 | Rubinfeld | 711/118 |
| 5,091,846 | 2/1992 | Sachs et al. | 711/130 |
| 5,155,824 | 10/1992 | Edenfield et al. | 711/143 |
| 5,179,679 | 1/1993 | Shoemaker | 711/118 |
| 5,197,144 | 3/1993 | Edenfield et al. | 711/143 |
| 5,224,214 | 6/1993 | Rosich | 711/117 |
| 5,251,310 | 10/1993 | Smelser | 711/144 |

OTHER PUBLICATIONS

M. Morris Mano, "Digital Design", Chapter 6, Prentice–Hall, Inc., 1984, pp. 220–229, 233–238 and pp. 305–307.

Thomas C. Bartee, "Digital Computer Fundamentals", sixth edition, McGraw–Hill Book Company, 1985, pp. 170–175.

*Primary Examiner*—Jack A. Lane
*Attorney, Agent, or Firm*—Skjerven, Morrill MacPherson, Franklin & Friel, L.L.P.

[57] ABSTRACT

A cache-based computer system is provided that attains the advantages of data prefetching while minimizing negative affects upon system bandwidth and overall system performance. When a microprocessor initiates a write cycle and a cache miss occurs, a master prefetch control circuit within a cache controller initiates a specialized bus transfer cycle referred to as a "write allocation and prefetch cycle". A slave prefetch control circuit responds to the initiation of the write allocation and prefetch cycle by latching the data from the microprocessor into a temporary storage element of a memory controller. The slave prefetch control circuit also initiates a burst read cycle simultaneously to access a corresponding block or line of prefetched data stored in system memory. The prefetched data is sequentially provided to the system bus and into the cache memory. Once the entire data block is read from system memory and transferred into the cache memory, the write data stored within the temporary storage element is written into the system memory.

15 Claims, 7 Drawing Sheets

CACHE-BASED COMPUTER SYSTEM EMPLOYING MEMORY CONTROL CIRCUIT AND METHOD FOR WRITE ALLOCATION AND DATA PREFETCH

This application is a continuation of application Ser. No. 08/423,472, filed Apr. 6, 1995 now abandoned which is a continuation of application Ser. No. 08/081,917 filed on Jun. 22, 1993, now abandoned.

COPYRIGHT NOTICE

Incorporated herein is an appendix of a VHSIC Hardware Description Language listing that discloses a computer system employing a write allocation and prefetch technique according to the present invention. Copyright, 1993, Dell Computer Corporation. A portion of the disclosure to this patent document contains material which is subject to copyright protection. The copyright owner has no objection to the facsimile reproduction by anyone of the Appendix, as it appears in the Patent and Trademark Office file or records, but otherwise reserves all copyright rights whatsoever.

BACKGROUND OF THE INVENTION

1. Field of the Invention

This invention relates to cache-based computer architectures and, more particularly, to write allocation and data prefetch techniques employed within cache-based computer systems. The invention also relates to memory control techniques for computer systems.

2. Description of the Relevant Art

Cache-based computer architectures are typically associated with specialized bus transfer mechanisms to support efficient utilization of the cache memory. A cache memory is a high-speed memory unit interposed in the memory hierarchy between the slower system memory and the microprocessor to improve effective memory transfer rates and, accordingly, improve system performance. The name refers to the fact that the small memory unit is essentially hidden and appears transparent to the user, who is aware only of a larger system memory. The cache is usually implemented by semiconductor memory devices having speeds that are compatible with the speed of the processor, while the system memory utilizes a less costly, lower-speed technology. The cache concept anticipates the likely reuse by the microprocessor of selected data in system memory by storing a copy of the selected data in cache memory.

A cache memory includes a plurality of memory sections, wherein each section stores a block or a "line" of one or more words. Each block has associated with it an address tag that uniquely identifies which block of system memory it is a copy of. When a request originates in the processor for a new word, whether it be data or instruction, an address tag comparison is made to see if a copy of the requested word resides in a block of the cache memory. If present, the data is used directly from the cache. If the desired word is not in the cache memory, the block is retrieved from the system memory, stored in the cache memory and supplied to the processor. Since the cache is of limited size, space must often be allocated within the cache to accommodate the new information. An algorithm based on history of use is typically implemented to identify the least necessary block of data to be overwritten by the new block.

In addition to using a cache memory to retrieve data, the processor may also write data directly to the cache memory instead of to the system memory. When the processor desires to write data to memory, a cache memory controller makes an address tag comparison to see if the data block into which data is to be written resides in the cache memory. If the data block is present in the cache memory, the data is written directly into the block. This event is referred to as a cache write "hit". As will be explained in greater detail below, in many systems a data "dirty bit" for the data block is then set. The dirty bit indicates that data stored within the data block is dirty (i.e., has been modified), and thus, before the data block is deleted from the cache memory or overwritten, the modified data must be written into system memory.

If the data block into which data is to be written does not exist in the cache memory, the data block is either fetched into the cache memory from system memory or the data is written directly into the system memory. This event is referred to as a cache write "miss". A data block which is overwritten or copied out of the cache memory when new data is stored in the cache memory is referred to as a victim block or a victim line.

Cache memories can be optimized according to a number of different features. One important feature which affects cache performance and design complexity is the handling of writes by the processor or an alternate bus master. As explained above, because two copies of a particular piece of data or instruction code can exist, one in system memory and a duplicate copy in the cache, writes to either system memory or the cache memory can result in an incoherence between the two storage units. For example, suppose specific data is stored at a predetermined address in both the cache memory and system memory. If a cache write hit to the predetermined address occurs, the processor proceeds to write the new data into the cache memory at the predetermined address. Since the data is modified in the cache memory but not in system memory, the cache memory and system memory become incoherent. Similarly, in systems with an alternate bus master, direct memory access (DMA) write cycles to system memory by the alternate bus master modify data in system memory but not in the cache memory. Again, the cache memory and system memory become incoherent.

An incoherence between the cache memory and system memory during processor writes can be handled by implementing one of several commonly employed techniques. In a first technique, a "write-through" cache guarantees consistency between the cache memory and system memory by writing to both the cache memory and system memory during processor writes. The contents of the cache memory and system memory are always identical, and so the two storage systems are always coherent. In a second technique, a "write-back" cache handles processor writes by writing only to the cache memory and setting a "dirty" bit to indicate cache entries which have been altered by the processor. When "dirty" or altered, cache entries are later replaced during a "cache replacement" cycle, the modified data is written back into system memory.

Depending upon which cache architecture is implemented, incoherency between the cache memory and system memory during a DMA read operation can be handled with bus watch or "snooping" techniques, with instructions executed by the operating system, or with combinations thereof. In a "write-through" cache, no special techniques are required during the DMA read operation. In a "write-back" cache, bus snooping can be employed to check the contents of the cache for altered data and sourcing data from the cache to the requesting bus master when appropriate to maintain coherency. When the cache memory is sourcing data to the requesting bus master, system memory is prohibited from supplying data to the requesting bus master. Alternatively, the operating system can execute an instruction to write "dirty" data from the cache memory into system memory prior to the DMA read operation. All "dirty" data is written out to system memory, thereby ensuring consistency between the cache memory and system memory.

Similarly during a DMA write operation, incoherency between the cache memory and system memory can be handled with bus "snooping" or monitoring, with instructions executed by the operating system, or with combinations thereof. In a "write-through" and a "write-back" cache, bus snooping invalidates cache entries which become "stale" or inconsistent with system memory following the DMA write operation. Alternatively, cache PUSH and INVALIDATE instructions can be executed by the operating system prior to the DMA write operation to write "dirty" or altered data out to system memory and to invalidate the contents of the entire cache. Since only a single copy of data exists in system memory following the instructions, the DMA write to system memory will not present the problem of possibly "stale" data in the cache.

Another important feature that affects cache performance and design complexity is data prefetching. Data prefetch techniques are used to enhance the probability of cache hit occurrences and are typically executed when a miss is encountered on an access to cache memory. Such prefetch techniques involve the transfer of a block or line of several words from system memory into the cache memory even though the immediate need is for only one word. If the required word is part of a stream of sequential instructions, it is likely that subsequent instructions will be retrieved with the required first word, making repeated access to system memory unnecessary.

When data prefetching is used in conjunction with a read operation, the system memory is controlled to provide a block of several words in address sequence at a high data rate. The requested word residing within the block is provided to the microprocessor while the entire block of words is stored in the cache memory. The transfer of the block of words is typically accomplished by burst memory access. During the data phase of a burst memory access cycle, a new word is provided to the system bus from system memory for several successive clock cycles without intervening address phases. The fastest burst cycle (no wait state) requires two clock cycles for the first word (one clock for the address, one clock for the corresponding word), with subsequent words returned from sequential addresses on every subsequent clock cycle. For systems based on the particularly popular model 80486 microprocessor, a total of four "doublewords" are transferred for a given burst cycle.

Prefetch techniques are similar when used in conjunction with write operations. FIG. 1 is a timing diagram that illustrates various signals associated with a prefetch technique that may be employed within a computer system based on the model 80486 microprocessor. The timing diagram of FIG. 1 represents a time duration encompassed by bus states 100–110.

The initial write request by the microprocessor occurs during bus state 101 when the address strobe signal $\overline{CADS}$ is asserted and the cycle definition control bus signals CC[3:0] are driven to indicate that the present cycle is a write cycle. If it is determined that the write operation is a cache miss cycle, address strobe signal $\overline{MADS}$ is asserted on the system bus by a cache controller during bus state 102. The addressing signal MA is also driven on the system bus, as well as cycle definition control signals MC[3:0]. At bus state 104, the write data MD is driven on the system bus and is stored within the system memory. At the same time, signals $\overline{MBRDY}$ and $\overline{MBLAST}$ are asserted by a memory controller to indicate that the write data has been accepted and that the cycle has completed.

The cache controller then issues a burst read request during bus state 105 to prefetch the line of data that corresponds to the address of the written data. This is accomplished by reasserting the system bus address strobe signal $\overline{MADS}$ and driving the system bus cycle definition signals MC[3:0] to indicate that the present cycle is a burst read request. It is noted that this burst read request is initiated independently of the microprocessor.

The first word of the prefetched data becomes available during bus state 109 and is written into the cache memory. During bus state 110 and subsequent bus states (not shown), the three remaining words of the fetched line are provided to the system bus and written into the cache memory. Since it is likely that the prefetched words will be accessed during subsequent cycles of the processor, repeated access to system memory may be unnecessary and overall processing speed may be increased.

Although data prefetching techniques have been quite successful in enhancing overall cache-hit occurrences in computer systems, such techniques can in some circumstances negatively impact system performance. One such circumstance may arise when the prefetching technique described in conjunction with FIG. 1 is employed. As illustrated by the timing diagram, the system bus is "busy" or occupied with signals for the entire time beginning with bus state 102 and ending with the second bus state that follows bus state 110. This limits the bandwidth of the system bus since subsequent system bus cycles initiated by the microprocessor or alternate bus master must be postponed until after the completion of the address phase and/or data phase of the prefetch cycle. This can degrade system performance.

In an attempt to increase the bandwidth of the system bus, an alternative prefetch technique may be employed. In this alternative technique, if the microprocessor initiates a write cycle and a cache miss occurs, the word is written directly into an allocated block of the cache memory (rather than into system memory). The cache controller concurrently initiates a burst read request to prefetch and store the remaining words of the block from system memory into the cache memory. Although this technique decreases the duration of signal activity on the system bus (since a write cycle to system memory is unnecessary), an incoherency arises since the word written to cache memory was not updated in system memory. The corresponding block of cache memory must accordingly be marked as "dirty".

The existence of dirty data within the cache memory can degrade system performance when direct memory access (DMA) transfers are performed and when cache replacement cycles are necessary. For example, as explained previously, during a DMA read operation, the existence of dirty data in the cache memory may necessitate the initiation of a "snoop" cycle to source the data from the cache memory rather than system memory. The initiation of such a snoop cycle often increases the overall time required to complete multi-word transfers, thus, degrading system performance. Similarly, during a cache replacement cycle when a new block of data is stored within the cache memory, the victim block must be transferred into system memory if it contains dirty data. The requirement of such a transfer can also degrade system performance.

SUMMARY OF THE INVENTION

The problems outlined above are in large part solved by a cache-based computer system employing a circuit and method for write allocation and prefetch control according to the present invention. The advantages attained by data prefetching are maintained within the computer system while the previously-mentioned negative affects upon system bandwidth and overall system performance are minimized.

A computer system according to the present invention may include a central processing unit (CPU) coupled via a local CPU bus to a cache memory and a cache controller. A system bus couples the cache memory and cache controller to a system memory and a memory controller. When the microprocessor initiates a write cycle and a cache miss occurs, a master prefetch control circuit within the cache controller initiates a specialized bus transfer cycle referred to herein as a "write allocation and prefetch cycle". A slave prefetch control circuit responds to the initiation of the write allocation and prefetch cycle by latching the data from the microprocessor into a temporary storage element of the memory controller. The slave prefetch control circuit also initiates a burst read cycle simultaneously to access a corresponding block or line of prefetched data stored in system memory. The prefetched data is sequentially provided to the system bus and into the cache memory. Once the entire data block is read from system memory and transferred into the cache memory, the write data stored within the temporary storage element is written into the system memory.

Since the data stored in the temporary storage element of the memory controller is not transferred into the system memory immediately but is rather held until after the corresponding block of prefetched data is read from system memory, and since the burst read cycle is initiated immediately, the bandwidth of the system bus may be increased in comparison to systems employing alternative prefetching techniques. Furthermore, since both the cache memory and system memory are updated with the written word, dirty data is not created. Thus, overall performance of the computer system is not degraded as a result of data incoherency.

Broadly speaking the present invention contemplates a data prefetch method for transferring data within a computer system including a microprocessor, a cache memory, a cache controller, a system memory, and a system memory controller. The method comprises the steps of identifying the occurrence of a cache write miss cycle initiated by the microprocessor, storing a data word associated with the write miss cycle into a temporary storage element, and retrieving a block of data residing within a range of address locations of system memory. Specifically, the range of address locations of the system memory includes an address location corresponding to the data word. The method further comprises the steps of storing the block of data within the cache memory and writing the data word into the system memory after the step of retrieving the block of data. The step of retrieving a block of data may be implemented by triggering a burst read cycle to system memory.

The present invention further contemplates a computer system comprising a microprocessor, a system bus, a cache memory coupled to the microprocessor and the system bus, and a cache controller coupled to the cache memory for controlling the storage and retrieval of data within the cache memory. The cache controller includes a master control circuit for providing a cycle definition signal to the system bus in response to a cache write miss event. The computer system further comprises a system memory and a system memory controller coupled to the system memory for controlling the storage and retrieval of data within the system memory. The memory controller includes a first storage element for temporarily storing data to be written into the system memory and a slave control circuit coupled to the system bus. The slave control circuit generates a first control signal that causes a data word provided from the microprocessor to be stored within the first storage element in response to the cycle definition signal, and further generates a second control signal that causes at least one prefetched data word to be read from the system memory and provided to the system bus. The slave control circuit finally generates a third control signal that causes the write data word to be stored within the system memory after the prefetched data word has been read from the system memory. The first storage element may be implemented using a latch.

The present invention additionally contemplates a memory controller for a computer system having a cached memory architecture including a system bus and a system memory. The memory controller comprises a write data latch for temporarily storing data provided from the system bus and a prefetch control circuit coupled to the write data latch. The prefetch control circuit provides a first control signal to a control terminal of the write data latch for storing a data word in response to a write cycle executing on the system bus, and further generates a data read signal for reading a plurality of data words from the system memory and sequentially providing the plurality of data words to the system bus. The prefetch control circuit finally generates a write signal that causes the write data word to be stored within the system memory after the plurality of data words have been read from the system memory.

BRIEF DESCRIPTION OF THE DRAWINGS

Other objects and advantages of the invention will become apparent upon reading the following detailed description and upon reference to the accompanying drawings in which.

Figure 1:
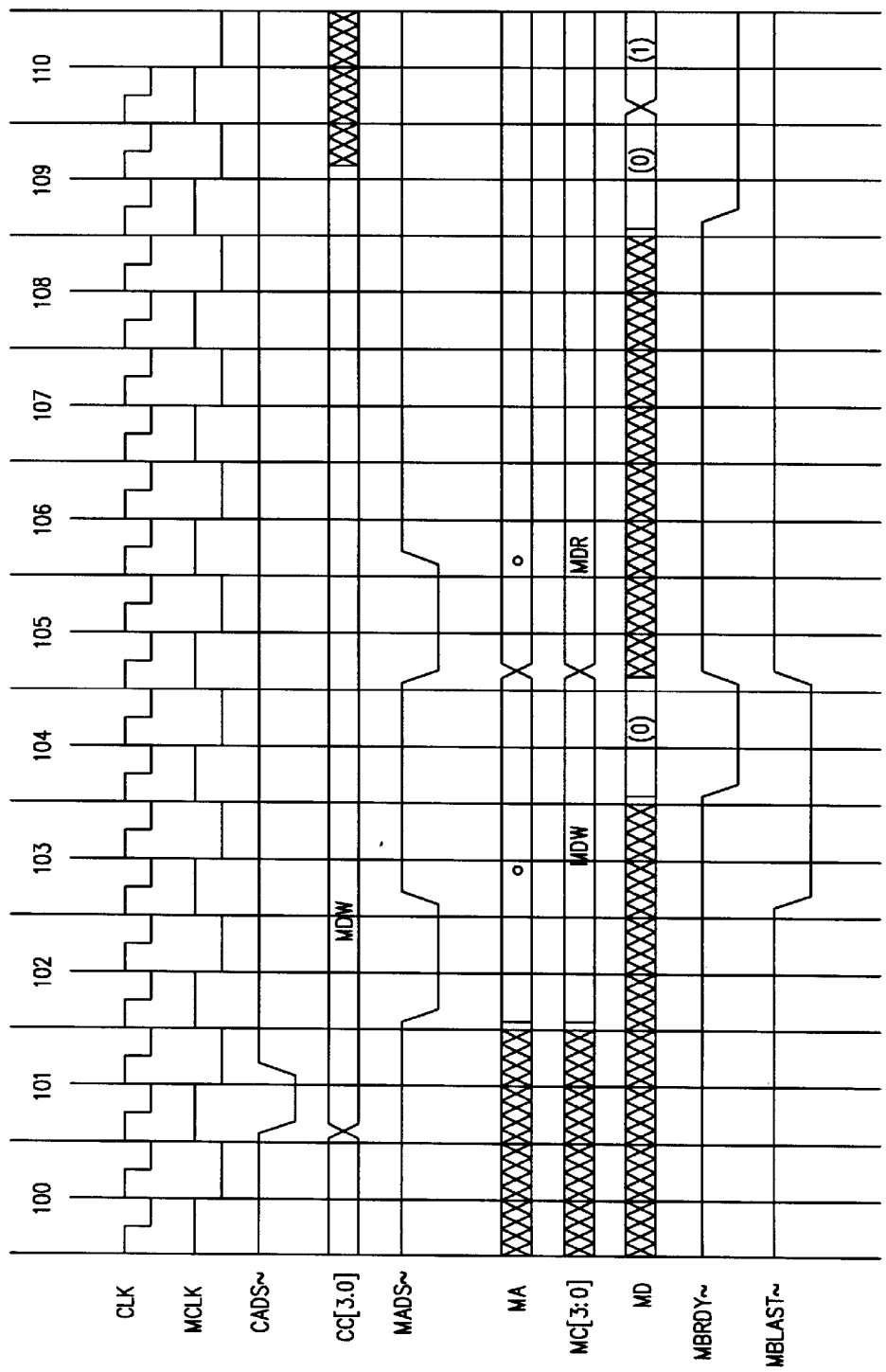
FIG. 1 is a timing diagram that illustrates various signals associated with a data prefetching technique.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 2:
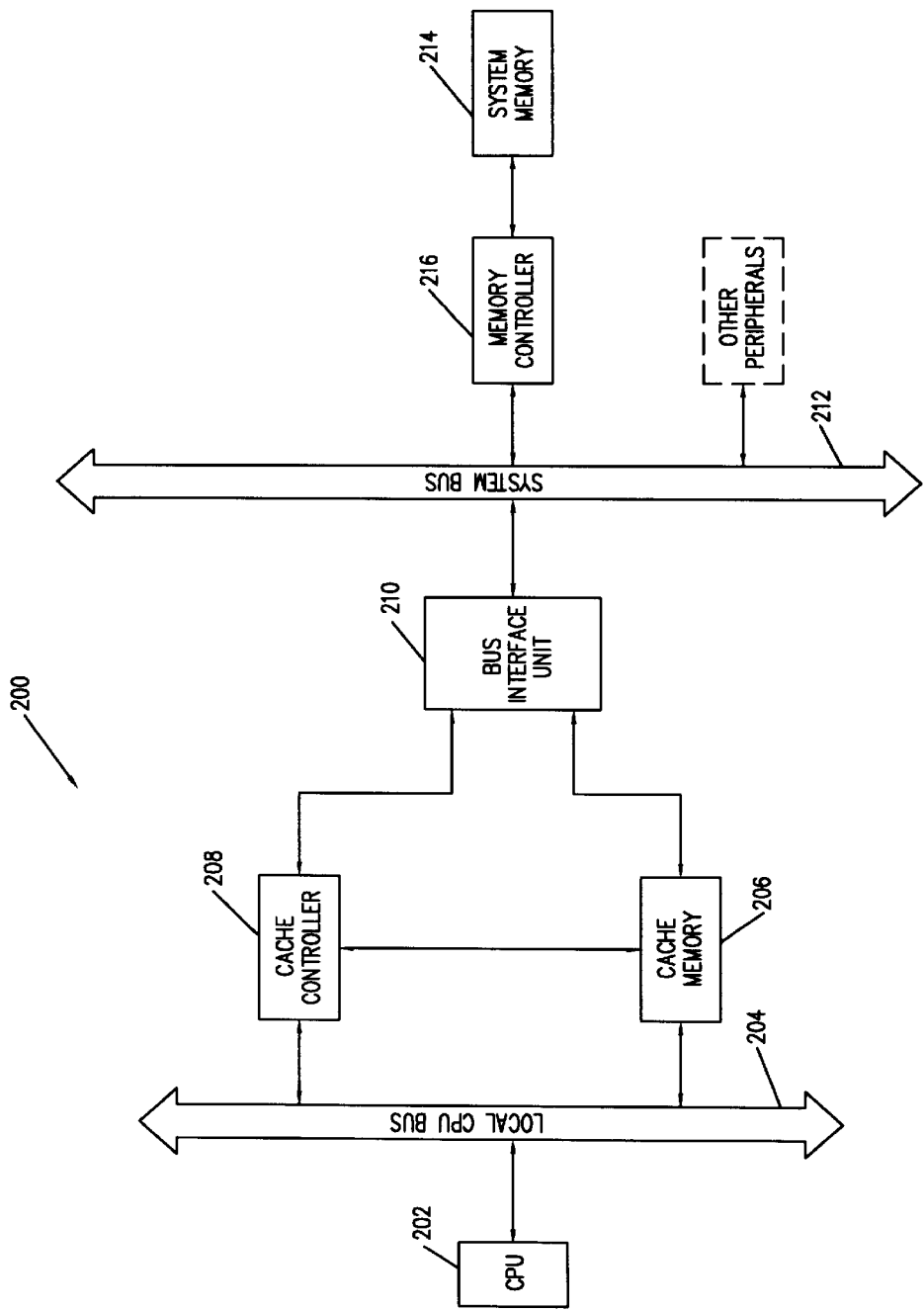
FIG. 2 is a block diagram of a computer system to which the present invention may be adapted.

Turning now to FIG. 2, a block diagram is illustrated of a computer system 200 to which the present invention is adapted. The computer system 200 includes a central processing unit (CPU) 202 coupled via a local CPU bus 204 to a cache memory 206 and a cache controller 208. A bus interface unit 210 provides an interface between a system bus 212 and the cache memory 206 and cache controller 208. A system memory 214 is also shown coupled to the system bus 212 through a memory controller 216.

In the illustrated form, the computer system 200 is a single processor, single-cache architecture. It is to be understood, however, that the present invention may be adapted to multi-processor and/or multi-cache systems. It is further understood that a variety of peripherals may also be coupled to system bus 212, such as an I/O bus bridge, a bus arbitrator, a DMA (direct memory access) unit and a mass storage device such as a disk unit.

CPU 202 is a data processing unit that implements a predetermined instruction set. Exemplary processing units include the model 80486 microprocessor as well as the Intel Pentium microprocessor. For situations in which the microprocessor includes an on-chip cache, such as in the model 80486 and Pentium microprocessors, cache memory 206 constitutes a secondary cache memory.

Cache controller 208 orchestrates the transfer of control signals between CPU 202 and bus interface unit 210, and further manages the transfer of data between CPU 202, cache memory 206 and bus interface unit 210. Cache controller 208 partially consists of conventional logic circuitry that allows the cache memory 206 to be read, written, updated, invalidated and flushed. It should be noted that in the preferred form, CPU 202, cache memory 206 and cache controller 208 operate concurrently to provide maximum sustained performance in the computer system.

System bus 212 has a predetermined bit width and is the computer system's primary bus. System memory 214 is a physical memory of a predetermined size and is implemented with DRAM (dynamic random access memory). Memory controller 216 controls and orchestrates the transfer of data, address and control signals communicating between system bus 212 and system memory 214.

Associated with each line of cache memory 206 is an address tag and state information. The address tag indicates a physical address in system memory 214 corresponding to each entry within cache memory 206. The state information is comprised of a valid bit and a dirty bit. The valid bit indicates whether a predetermined cache line contains valid cache data, while the dirty bit identifies the write status of each cache line. In an invalid state, there is no data in the appropriate cache memory entry. In a valid state, the cache memory entry contains data which is consistent with system memory 214. In a dirty state, the cache memory entry contains valid data which is inconsistent with system memory 214. Typically, the dirty state results when a cache memory entry is altered by a write operation.

Figure 3:
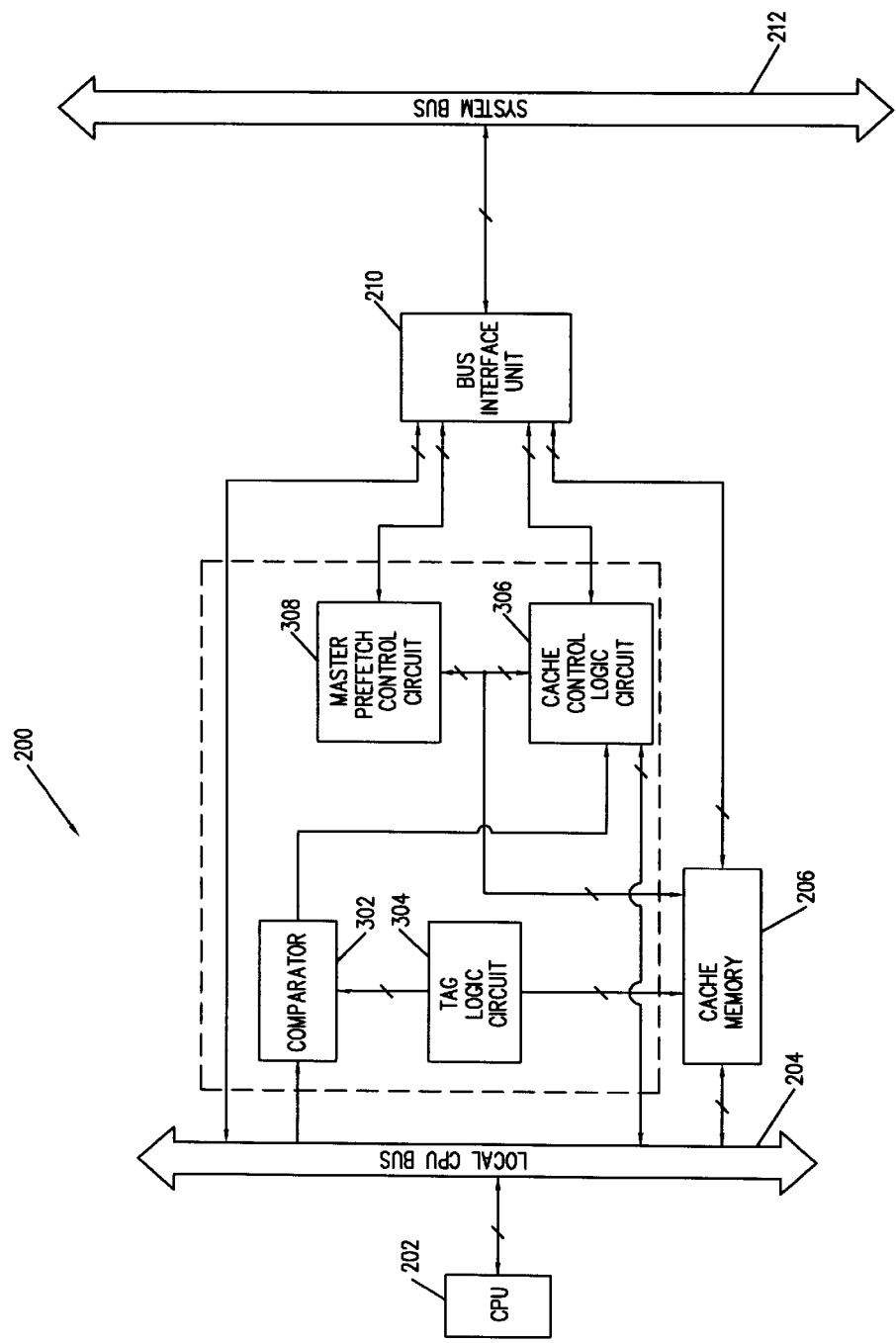
FIG. 3 is a block diagram that illustrates internal circuit elements of a cache controller including a master prefetch control circuit according to the present invention.

Referring next to FIG. 3, a block diagram is shown that illustrates further details of cache controller 208. Circuit portions corresponding to those of FIG. 2 are numbered identically. For simplicity and clarity, various well-known circuit portions and interconnections of the cache controller 208 have been omitted and will not be discussed in detail herein.

The local CPU bus 204 is coupled to an input of comparator 302 for providing a physical address signal from CPU 202. A second input of comparator 302 is coupled to a tag logic circuit 304. An output of comparator 302 for providing a "hit/miss" signal is coupled to a cache control logic circuit 306. The cache control logic circuit 306 is also coupled to bus interface unit 210, cache memory 206 and CPU 202.

Cache control logic circuit 306 includes conventional circuitry that controls well-known caching functions such as read, write, and flush operations. It will be appreciated by those skilled in the art that the cache control logic circuit 306 as well as other aspects of cache controller 208 including comparator 302 and tag logic circuit 304 could be implemented using a variety of specific circuit configurations. Examples of such specific circuit configurations may be found in a host of publications of the known prior art, including U.S. Pat. No. 5,091,875 issued to Rubinfeld on Feb. 25, 1992 and U.S. Pat. No. 5,091,876 issued to Sachs et al. on Feb. 25, 1992. These patents are incorporated herein by reference in their entirety.

Cache controller 208 also includes a master prefetch control circuit 308. The master prefetch control circuit 308 is coupled to receive the "hit/miss" signal from comparator 302, and is connected to the bus interface unit 210, cache memory 206 and cache control logic circuit 306. As will be described in detail below, the master prefetch control circuit 308 controls the transfer of data on system bus 212 when a cache write miss event occurs, and initiates a data prefetch cycle to transfer a block of corresponding data from system memory 214 into cache memory 206.

Figure 4:
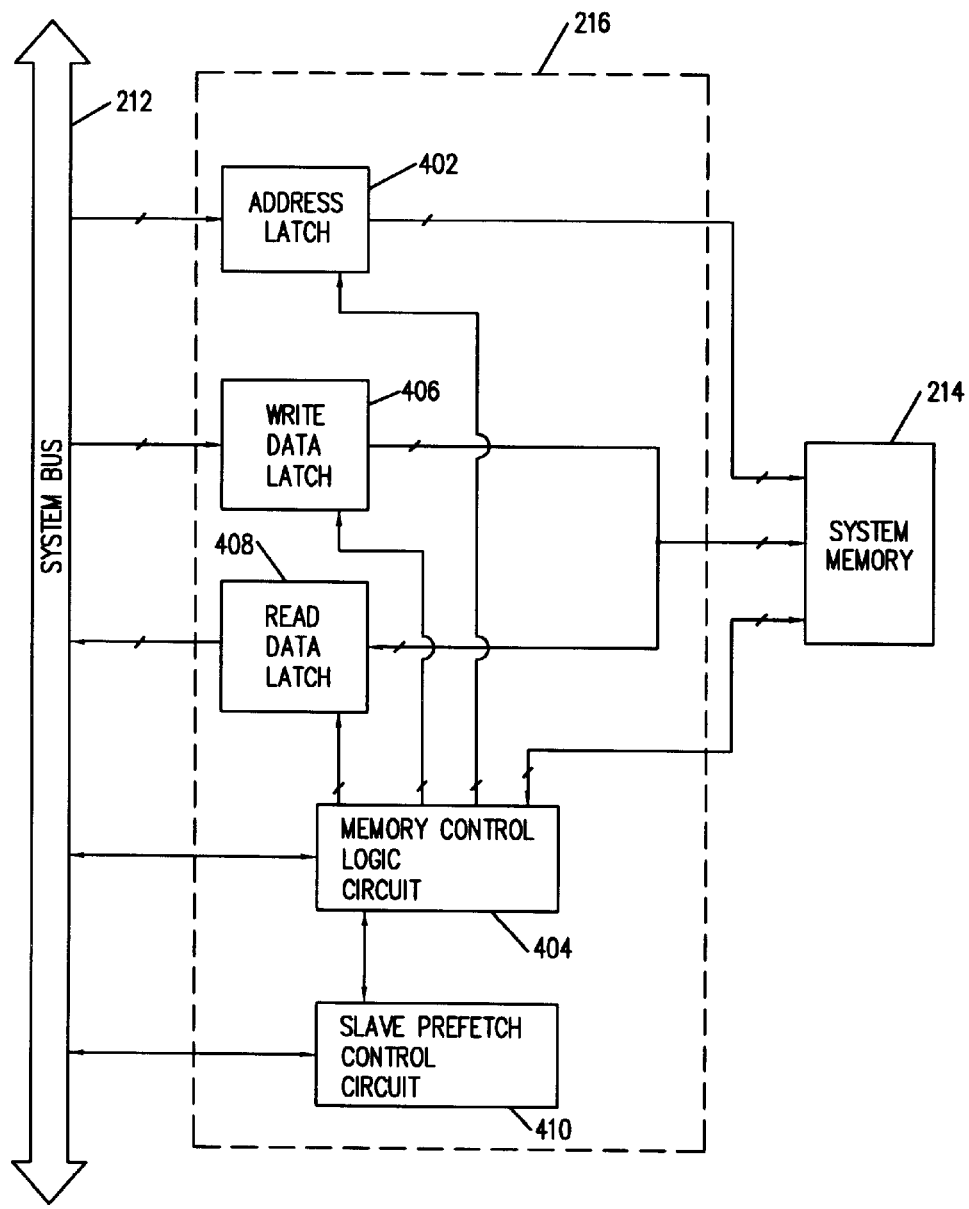
FIG. 4 is a block diagram that illustrates internal circuit elements of a memory controller including a slave prefetch control circuit according to the present invention.

Referring now to FIG. 4, a block diagram is shown that illustrates memory controller 216 in greater detail. Circuit portions corresponding to those of FIG. 2 are numbered identically. For simplicity and clarity, various well-known circuit portions and interconnections of the memory controller have been omitted and will not be discussed in detail herein.

Memory controller 216 includes an address latch 402 coupled to system bus 212 and to system memory 214. The latching of address signals within address latch 402 is controlled by a memory control logic circuit 404 during the address phases of cycles executing on system bus 212. A write data latch 406 and a read data latch 408 are similarly coupled between system bus 212 and system memory 214 and are controlled by memory control logic circuit 404 during the data phases of cycles executing on system bus 212. It is noted that memory control logic circuit 404 supports single-word read and write accesses to system memory 214 as well as multi-word burst accesses.

The internal configuration of memory control logic circuit 404 may vary depending upon the particular components employed within the computer system and upon the desired memory controlling functions. Various memory control logic circuits are known that support single-word and multi-word memory accesses. It will be appreciated by those skilled in the art that the memory control logic circuit 404 as well as other aspects of memory controller 216 such as address latch 402, write data latch 406 and read data latch 408 could be implemented using a variety of specific circuit configurations. Examples of such specific circuit configurations may be found in a host of publications of the known prior art, including U.S. Pat. No. 4,366,539 issued to Johnson et al. on Dec. 28, 1982 and U.S. Pat. No. 4,649,511 issued to Gdula on Mar. 10, 1987. These patents are incorporated herein by reference in their entirety.

Memory controller 216 also includes a slave prefetch control circuit 410 coupled to system memory 214, address latch 402, write data latch 406 and read data latch 408 through memory control logic circuit 404. As will be better understood below, the slave prefetch control circuit 410 is responsive to signals generated by the master prefetch control circuit 308 when a cache write "miss" event occurs. The slave prefetch control circuit 410 causes write data from CPU 202 to be temporarily stored in write data latch 406, and initiates a prefetch cycle to retrieve a block of corresponding data from system memory 214 for storage within cache memory 206. The slave prefetch control circuit 410 thereafter causes the data temporarily residing in write data latch 406 to be stored within system memory 214. The specifics of this bus transfer mechanism will be described in detail further below.

Referring collectively to FIGS. 3 and 4, general aspects concerning the operation of computer system 200 are next considered. If CPU 202 initiates a read request requiring the retrieval of data from memory, a data request signal is provided to cache control logic circuit 306. At approximately the same time, the address of the requested data is driven on the local CPU bus 204 by CPU 202. The tag logic circuit 304 includes the physical addresses of data stored within cache memory 206 and a tag portion that provides current state information regarding the data in the cache memory 206. The state information in tag logic circuit 304 includes information such as valid, invalid, and dirty data. If the physical address provided by CPU 202 matches an entry within the tag logic circuit 304, and if the particular cache entry is valid, a "hit" is indicated by comparator 302. Cache control logic circuit 306 responsively causes the cache memory 206 to provide the addressed data to the CPU 202. If the address does not match an entry within cache memory 206, comparator 302 generates a "miss" signal. Cache control logic circuit 306 responsively initiates a memory read cycle on system bus 212 through bus interface unit 210. The memory control logic circuit 404 of memory controller 216 receives the read request signal and responsively latches the corresponding address within address latch 402. Memory control logic circuit 404 concurrently generates read control signals that cause the addressed data to be read from system memory 214. When the data is available at an output port of system memory 214, the data is latched within read data latch 408 and is driven on system bus 212. The bus interface unit 210 accordingly receives the read data and provides the data to CPU 202 and cache memory 206. This portion of operation is conventional.

If CPU 202 initiates a request to write data to memory, a write request signal is provided to cache control logic circuit 306. At approximately the same time, the address of the location to be written is driven on the local CPU bus 204 by CPU 202. If the physical address provided by CPU 202 matches an entry within the tag logic circuit 304, and if the particular cache entry is valid, a "hit" is indicated by comparator 302. Cache control logic circuit 306 responsively causes the word to be written into the corresponding physical address within cache memory 206. This portion of operation is also conventional.

If, on the other hand, the physical address does not match an entry within cache memory 206, comparator 302 generates a "miss" signal. This cache write miss event, causes the initiation of a specialized bus transfer cycle referred to herein as a "write allocation and prefetch cycle". The write allocation and prefetch cycle is initiated by the master prefetch control circuit 308. Once initiated, the master prefetch control circuit 308 and the slave prefetch control circuit 410 interact cooperatively to effectuate the requested write of data into system memory 214 and to prefetch a corresponding block or line of data from system memory 214 for storage within cache memory 206. As explained previously, the technique of prefetching a block of data from system memory 214 is performed to enhance the probability of cache hit occurrences during subsequent cycles.

Figure 5:
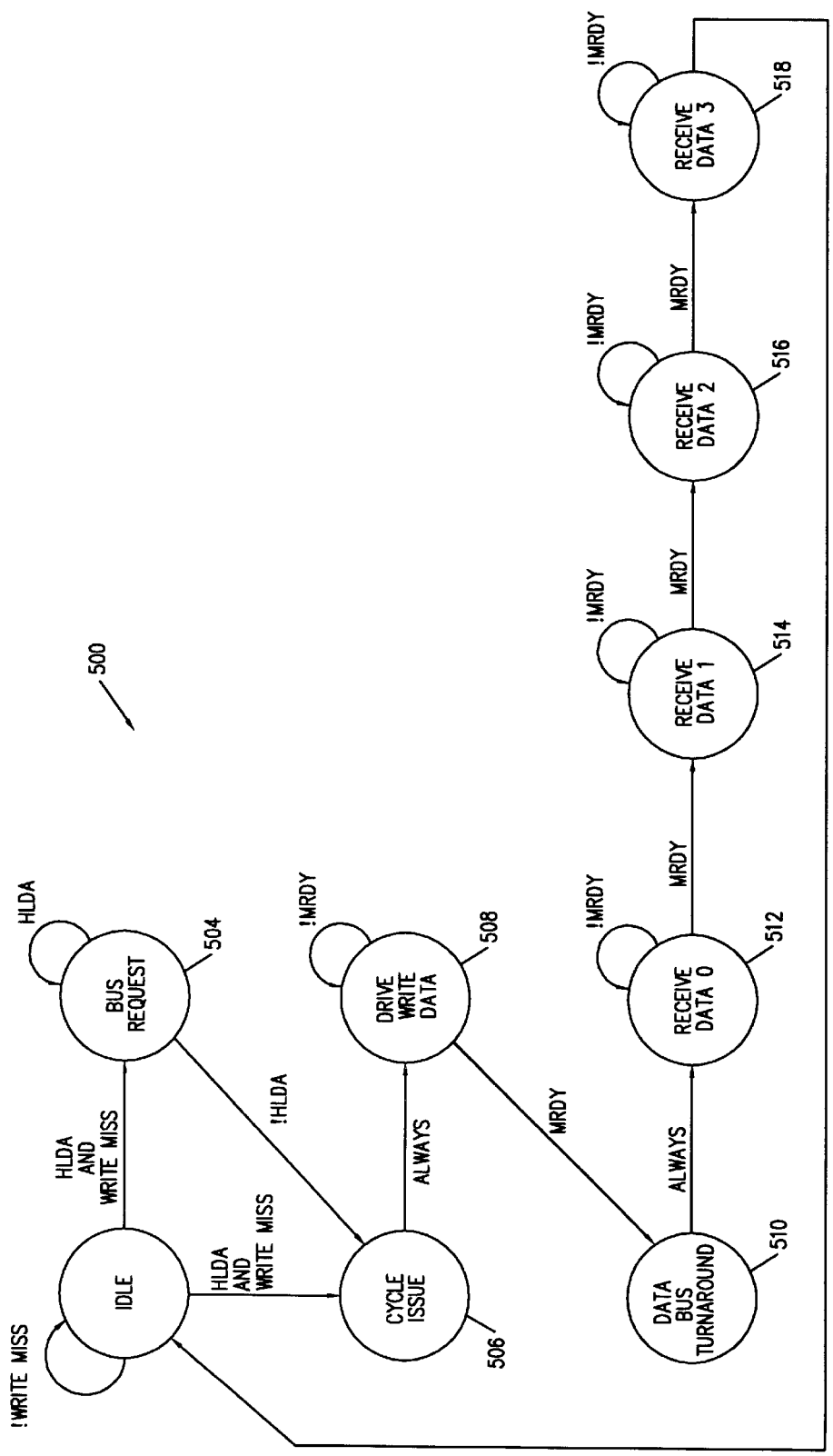
FIG. 5 is a chart of an algorithmic state machine that defines one implementation of a master prefetch control circuit according to the present invention.
Figure 6:
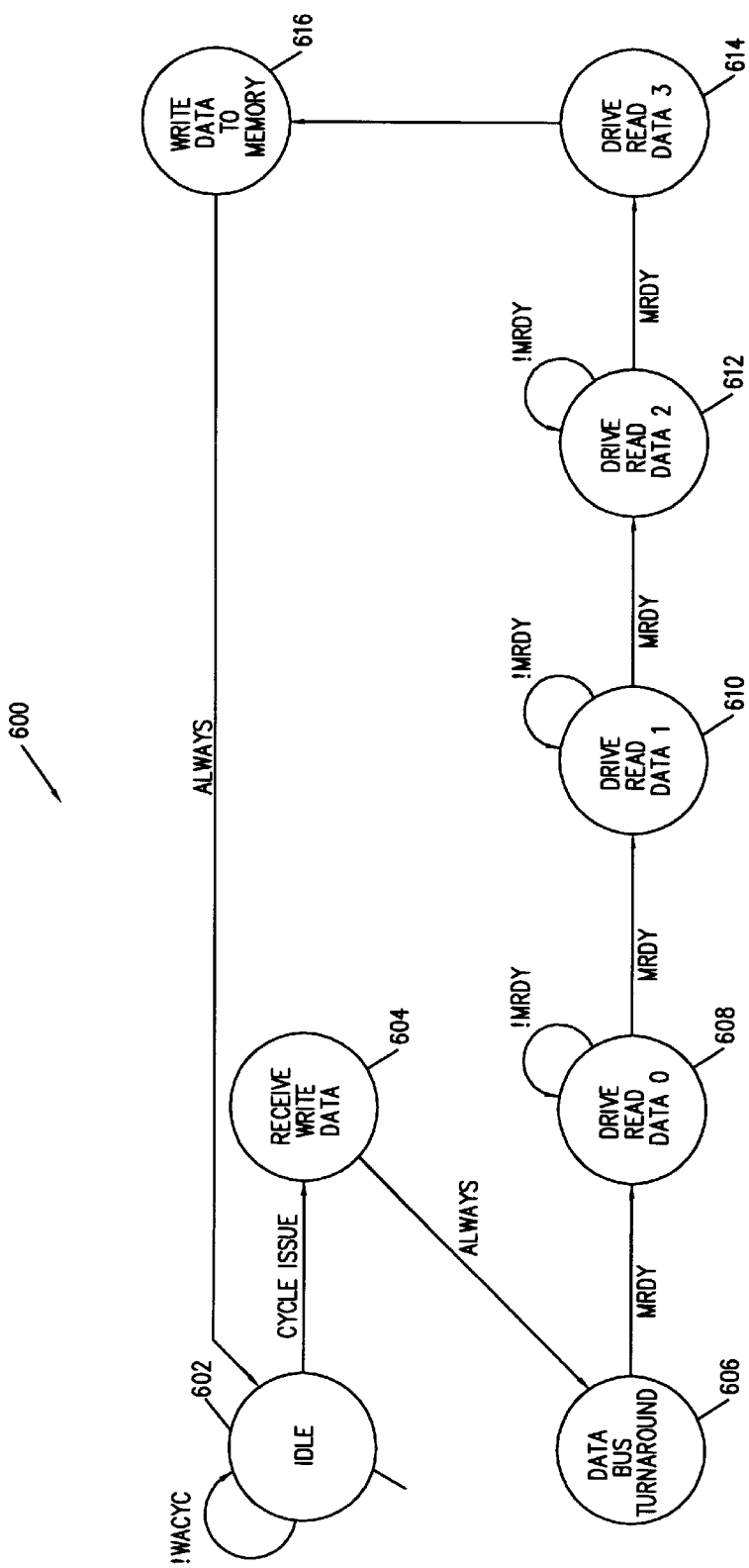
FIG. 6 is a chart of an algorithmic state machine that defines one implementation of a slave prefetch control circuit according to the present invention.

FIG. 5 is a diagram of an algorithmic state machine 500 that defines one configuration of master prefetch control circuit 308, and FIG. 6 is a diagram of an algorithmic state machine 600 that defines one configuration of slave prefetch control circuit 410. The following description as well as the state machine diagrams of FIGS. 5 and 6 make specific reference to signals generated by or associated with the model 80486 microprocessor. It is to be understood, however, that the specific signals referred to are exemplary and that the present invention may be implemented in conjunction with other microprocessors and/or other specific control signals.

Upon reset of the computer system 200, state machine 500 assumes an initial state labeled idle state 502 and state machine 600 assumes an initial state labeled idle state 602. State machines 500 and 600 remain idle until a cache write miss event occurs. When a cache write miss event occurs, state machines 500 and 600 execute the write allocation and prefetch cycle as described below.

During idle state 502, state machine 500 monitors the hit/miss output signal of comparator 302 as well as specific write control signals generated by CPU 202 to determine whether a write miss event has occurred. For the model 80486 microprocessor, the occurrence of a write cache miss event can be determined in accordance with the following logical equation:

Write Miss=!$\overline{ADS}$ * $\overline{M/IO}$ * $D/\overline{C}$ W/$\overline{R}$ * Hit$\overline{Miss}$ Signals $\overline{ADS}$, M/$\overline{IO}$, D/$\overline{C}$, and W/$\overline{R}$ are output signals generated by the model 80486 microprocessor. The low assertion of signal $\overline{ADS}$ indicates that a valid address and a valid cycle definition are being driven on the local CPU bus 204. The assertion of this signal marks the beginning of a bus cycle. Signal M/$\overline{IO}$ differentiates memory space from I/O space and is used for bus cycle definition. Similarly, signal D/$\overline{C}$ differentiates data cycles from all other cycles and is also used for bus cycle definition. Finally, signal W/$\overline{R}$ indicates whether the cycle is a write or read.

When a write miss event occurs as determined by the above logical equation, state machine 500 makes a transition from idle state 502 to either bus request state 504 or cycle issue state 506. If an alternate bus master does not have control of the system bus 212, signal HLDA is not asserted by CPU 202 and therefore state machine 500 makes a transition directly into the cycle issue state 506. If, on the other hand, an alternate bus master has control of the system bus 212, signal HLDA is asserted by CPU 202 and forces state machine 500 into bus request state 504. Signal HLDA (hold acknowledge) is generated in response to a HOLD signal generated by the alternate bus master. State machine remains in this state until signal HLDA is deasserted at which time a transition is made to cycle issue state 506.

During cycle issue state 506, a write allocation and prefetch cycle type is initiated on system bus 212. This is accomplished by driving an encoded cycle definition signal on a set of control lines of system bus 212 to identify the cycle type that is occurring. At the same time, an address strobe signal is asserted and the address signal identifying the memory location to which the data is to be written is driven on system bus 212. State machine 600 simultaneously receives and decodes the cycle definition signal and the address strobe signal to determine that a write allocation and prefetch cycle is occurring. State machine 600 accordingly makes a transition from idle state 602 to a receive write data state 604.

After state machine 500 initiates the write allocation and prefetch cycle during state 506, the write data from CPU 202 is driven on system bus 212 during a drive write data state 508. This write data is concurrently latched into write data latch 406 in response to a control signal generated during state 604. At approximately the same time during state 604, state machine 600 triggers memory control logic circuit 404 to initiate a burst read transfer of a block of data corresponding to the addressing signal stored by address latch 402.

Upon latching the write data into write latch 406, the state machine 600 asserts signal $\overline{\text{MBRDY}}$ which causes state machine 500 to make a transition from state 508 to a data bus turnaround state 510. At approximately the same time, state machine 600 makes a transition from state 604 to a data bus turnaround state 606. During the data bus turnaround states 510 and 606, a "dummy" clock or a wait state is issued to allow cache memory 206 to turn off its internal data buffers before reading the prefetched data retrieved from system memory 214.

The state machine 600 of the slave prefetch control circuit 410 then enters state 608. During state 608, the first word of the prefetched block of data is latched within read data latch 408. State machine 600 accordingly generates a signal to enable the output of read data latch 408 to thereby drive the data on system bus 212. At approximately the same time, state machine 600 asserts signal $\overline{\text{MBRDY}}$. The assertion of signal $\overline{\text{MBRDY}}$ accordingly causes state machine 500 to store the data within cache memory 206 during state 512. The following three words of the prefetched block are similarly transferred in sequence during states 610, 612 and 614 of state machine 600, and during states 514, 516 and 518 of state machine 500. At the same time, memory controller 216 also merges the write data (stored in write data latch 406) into the corresponding location of the prefetched line during one of states 608, 610, 612 or 614 to thereby update the prefetched line with the write data as the line is being transferred to cache memory 206.

After the last word of the burst cycle is latched within read data latch 408, state machine 600 makes a transition from state 614 to a state 616. During state 616, the data temporarily stored in write data latch 406 is loaded into system memory 214. The write request initiated by CPU 202 is thereby completed, and state machines 500 and 600 assume the initial idle states 502 and 602.

The algorithmic state machines 500 and 600 may be reduced to sequential logic circuits by employing a variety of well known circuit techniques. For example, sequential logic circuitry that implements state machines 500 and 600 may be attained in accordance with the state reduction techniques taught within the publication *Digital Design* by M. Morris Mano, Prentice-Hall, Inc., pgs. 220–236; and within the publication *Digital Computer Fundamentals—Sixth Edition* by Thomas Bartee, McGraw-Hill Book Company, pgs. 170–175. These publications are incorporated herein by reference.

Computer-aided design tools may alternatively be employed to reduce the state machines 500 and 600 to sequential logic circuitry. Exemplary computer-aided design tools include the behavioral language Verilog as well as VHSIC hardware description language.

Figure 7:
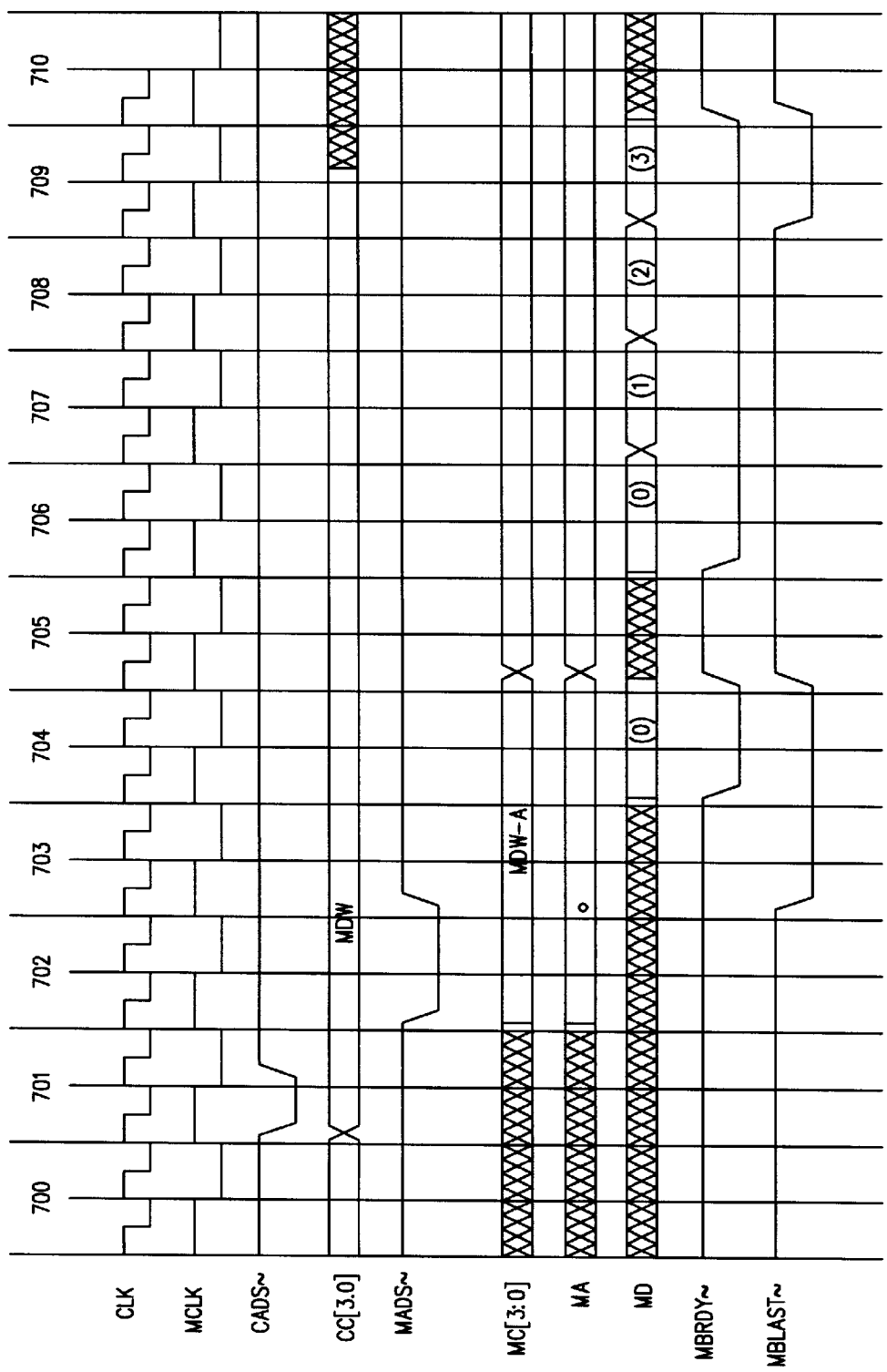
FIG. 7 is a timing diagram that illustrates various signals associated with a write allocation and prefetch bus transfer cycle according to the present invention.

FIG. 7 is a timing diagram that illustrates several signals associated with the write allocation and prefetch cycle described above. The timing diagram of FIG. 7 represents a time duration encompassed by bus states 700–710. During bus state 701, CPU 202 initiates a write cycle by asserting the address strobe signal $\overline{\text{CADS}}$ and by driving the bus cycle definition control bus CC[3:0] to indicate a write cycle. If the address of the write data is not contained in cache memory 206, the master prefetch control circuit 308 initiates a write allocation and prefetch cycle. Accordingly, the master prefetch control circuit 308 asserts signal $\overline{\text{MADS}}$ during bus state 702 drives the system bus cycle definition signals MC[3:0] to indicate that the present cycle write allocation and prefetch cycle. The addressing signal MA is also driven on the system bus 212 during bus state 702.

The write data is driven on system bus 212 during bus state 704, as shown by signal MD. At the same time, signals $\overline{\text{MBRDY}}$ and $\overline{\text{MBLAST}}$ are asserted by slave prefetch control circuit 410 to indicate that memory controller 216 has accepted the write data. It is noted that at approximately the same time, slave prefetch control circuit 410 also triggers memory control logic circuit 404 to initiate a burst read from system memory 214. During bus states 706–709, a line of four words are provided to system bus 404 through data latch 408 in response to the burst read request.

In accordance with the write allocation and prefetch cycle described above, the data word provided from CPU 202 is latched into write data latch 406 immediately after a write miss event is detected. Since the data stored in write data latch 406 is not transferred into system memory 214 immediately but is rather temporarily stored by latch 406, the corresponding burst read to system memory 214 may be initiated contemporaneously with the storage of data within latch 406. The prefetched data is therefore made available to the system data bus sooner in comparison to the prefetch technique illustrated by FIG. 1. Furthermore, since the write allocation and prefetch cycle described above requires only one assertion of the memory bus address strobe signal $\overline{\text{MADS}}$, the address phase of the cycle is completed sooner in comparison to the technique of FIG. 1. Therefore, the bandwidth of the system bus may be increased. Additionally, since dirty data is not created during the cycle, system performance is not degraded due to data incoherency.

It is noted that the present invention may be implemented in conjunction with a variety of other bus transfer techniques and alternative system configurations. For example, the present invention may be implemented in conjunction with systems employing either non-pipelining or pipelining techniques. Similarly, the present invention may be implemented within multi-processor and/or multi-cache systems.

An appendix is further incorporated herein by reference. The appendix discloses a VHSIC Hardware Description Language listing of a computer system that employs a circuit and method for write allocation and data prefetch according to the present invention.

Numerous variations and modifications will become apparent to those skilled in the art once the above disclosure is fully appreciated. It is intended that the following claims be interpreted to embrace all such variations and modifications.

What is claimed is:

1. A computer system comprising:

a microprocessor;

a system bus;

a cache memory coupled to said microprocessor and said system bus, said cache memory comprising a plurality of lines of data storage, each said line comprising a plurality of data words each having a specific position within said line, said cache memory for providing data to said microprocessor;

a system memory coupled to said system bus;

a cache controller coupled to said cache memory for controlling the storage and retrieval of data within said cache memory, wherein said cache controller includes a master control circuit for providing a cycle definition signal to said system bus in response to a cache write miss event, said cycle definition signal communicating to said system memory over said system bus a request to prefetch a line of data relating to said cache write miss event that is stored in said system memory; and a system memory controller coupled to said system memory and to said system bus for controlling storage and retrieval of data within said system memory, wherein said memory controller includes a first storage element coupled to said system memory for temporarily storing data to be written into said system memory upon the occurrence of said cache write miss event, and a slave control circuit coupled to said system bus, wherein said slave control circuit generates a first control signal that causes a data word provided from said microprocessor to be stored within said first storage element in response to said cycle definition signal, and concurrently generates a second control signal that causes said prefetched line of data to be read from said system memory and provided to said system bus for storage in said cache memory and further generates a third control signal that causes said data word stored in said first storage element to be stored within said system memory after said prefetched line of data has been read from said system memory;

wherein said data word is merged into said prefetched line of data in its specific position prior to said line of data being provided to said system bus.

2. The computer system as recited in claim 1 wherein said first storage element is a latch circuit having an input port coupled to said system bus and an output port coupled to said system memory.

3. The computer system as recited in claim 1 wherein said system memory controller further includes a second storage element for temporarily storing said prefetched data word read from said system memory.

4. The computer system as recited in claim 3 wherein said second storage is a latch circuit having an input port coupled to said system memory and an output port coupled to said system bus.

5. The computer system as recited in claim 1 wherein said second control signal causes a plurality of prefetched data words to be sequentially read from system memory.

6. The computer system as recited in claim 1 wherein said master control circuit and said slave control circuit are sequential state machines.

7. The computer system as recited in claim 1 wherein said second control signal triggers a burst read cycle to read a plurality of prefetched data words from said system memory.

8. The computer system as recited in claim 1 wherein said cache controller further includes a comparator circuit coupled to said master control circuit, wherein said comparator generates a cache miss signal.

9. A memory controller for a computer system having a cached memory architecture including a cache memory, a system bus and a system memory, said memory controller coupled to said system memory and said system bus, said memory controller comprising:

a write data latch for coupling to said system memory and said system bus for temporarily storing data provided from said system bus upon the occurrence of a cache write miss; and a prefetch control circuit coupled to said write data latch, wherein said prefetch control circuit provides a first control signal to a control terminal of said write data latch for storing a data word in said write data latch in response to a write cycle executing on said system bus, and concurrently generates a data read signal for reading a plurality of data words from said system memory corresponding to a cache line related to said cache write miss, merging said temporarily stored data into a specific position within said cache line, and sequentially providing said plurality of data words to said system bus for storage in said cache memory, and further generates a write signal that causes said data word stored in said write data latch to be stored within said system memory after said plurality of data words have been read from said system memory.

10. The memory controller as recited in claim 9 further comprising a read data latch having an output coupled to said system bus for temporarily storing data provided from said system memory.

11. A data prefetch method for transferring data within a computer system including a microprocessor, a cache memory and a cache controller each coupled to said microprocessor and said system bus, a system memory and a system memory controller coupled to said system bus, said method comprising the steps of:

identifying the occurrence of a cache write miss cycle initiated by said microprocessor;

storing a data word associated with said write miss cycle into a temporary storage element through said system bus for storage adjacent said system memory;

while storing said data word, concurrently retrieving a block of data residing within a range of address locations of said system memory, wherein said range of address locations of said system memory includes an address location corresponding to said data word;

storing said block of data within said cache memory; and writing said data word into said system memory after said step of retrieving said block of data.

12. The data prefetch method as recited in claim 11 wherein said step of retrieving a block of data includes the step of initiation a burst read cycle to system memory.

13. A data and prefetch control circuit for controlling the transfer of data within a computer system including a system bus, a microprocessor, a cache memory and a cache controller coupled to said microprocessor and said system bus, a system memory and a system memory controller coupled to said system bus, said data and prefetch control circuit comprising:

means for identifying the occurrence of a cache write miss cycle initiated by said microprocessor;

means for storing a data word associated with said write miss cycle from said system bus and into a temporary storage element located adjacent said system memory;

means for concurrently retrieving a block of data residing within a range of address locations of said system memory while storing said data word, wherein said range of address locations of said system memory includes an address location corresponding to said data word;

means for storing said block of data within said cache memory; and means for writing said data word into said system memory after retrieving said block of data.

14. The data prefetch control circuit as recited in claim 13 wherein said temporary storage element is a latch.

15. The data prefetch control circuit as recited in claim 13 wherein said means for retrieving a block of data includes a means for initiating a burst read cycle to system memory.

* * * * *